United States Patent
Yang et al.

(10) Patent No.: US 7,034,957 B2
(45) Date of Patent: Apr. 25, 2006

(54) METHOD FOR INCREASING SIGNAL TO NOISE RATIO

(76) Inventors: Shang-Yu Yang, 90, Lane 350, Cheng-Kuan Rd., Jen-Wu, Kaohsiung (TW); Chen-Hsiang Shih, 37-3, Yung-Feng Lane, Ho-Ming Tsun, Hsiu-Shui Hsiang, Chang-Hua (TW); Chin-Lin Chang, 3F, No. 3, Alley 37, Lane 152, Sec. 2, Chung-Hsing Rd., Chu-Tung, Hsin-Chu (TW)

( * ) Notice: Subject to any disclaimer, the term of this patent is extended or adjusted under 35 U.S.C. 154(b) by 818 days.

(21) Appl. No.: 10/121,545

(22) Filed: Apr. 15, 2002

(65) Prior Publication Data
US 2003/0193592 A1 Oct. 16, 2003

(51) Int. Cl.
*B41B 15/00* (2006.01)
(52) U.S. Cl. .............. 358/1.2; 358/475; 358/509; 358/520; 358/463; 348/297; 348/362; 348/312; 250/208.1; 250/226
(58) Field of Classification Search .......... 358/475, 358/509, 520, 463; 348/297, 362, 312; 250/208.1, 250/226

See application file for complete search history.

(56) References Cited

U.S. PATENT DOCUMENTS

| | | | | |
|---|---|---|---|---|
| 4,985,882 A | * | 1/1991 | Tanaka et al. | 369/44.32 |
| 5,479,207 A | * | 12/1995 | Degi et al. | 348/297 |
| 5,773,814 A | * | 6/1998 | Phillips et al. | 250/208.1 |
| 6,084,936 A | * | 7/2000 | Patch | 378/4 |
| 6,933,168 B1 | * | 8/2005 | Bawolek et al. | 438/70 |
| 2005/0219378 A1 | * | 10/2005 | Kubota et al. | 348/222.1 |

* cited by examiner

*Primary Examiner*—Mark Wallerson
*Assistant Examiner*—Negussie Worku
(74) *Attorney, Agent, or Firm*—Berkeley Law & Technology Group LLC

(57) ABSTRACT

A method for increasing signal to noise ratio is disclosed. The method can automatically detect saturation output voltage of the photosensors via adjusting exposure time or illumination intensity so as to obtain optimum output voltage of the photosensors as well as high signal to noise ratio that can generate high quality images.

13 Claims, 3 Drawing Sheets

METHOD FOR INCREASING SIGNAL TO NOISE RATIO

BACKGROUND OF THE INVENTION

1. Field of the Invention

The present invention relates to a method for increasing signal to noise ratio, and more particularly to a method for increasing signal to noise ratio that can automatically detect saturation output voltage of photosensors via adjusting exposure time or illumination intensity so as to obtain optimum output voltage of the photosensors.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In conventional optical scanners, the CCD sensor is slowly scanned across a document. The photoelectric sensing elements are continuously exposed. After a fixed exposure time, a line of charges (representing a line of pixels of the image) are dumped from the photoelectric sensing elements to one or more analog shift registers. Once the charges are dumped, the photoelectric sensing elements resume generating charges in response to the light to which they are exposed. However, before the next line of charges can be dumped, the analog shift registers must be cleared and the charges stored therein must be processed.

The processing time for the data in the CCD sensor includes the time required to serially shift a line of charges from the analog shift registers, to convert the charges to analog voltages, to digitize the voltages, to perform any desired image processing and to store the digital representation of each pixel in the RAM. Once all pixels or charges of a line have been processed, the charges of the next line can be dumped from the photoelectric sensing elements. Thus, the time required to process all pixels or charges of a line would be equal to the exposure time of the CCD sensor. Conventional optical scanners fix the exposure time equal to this processing time. For example, if it takes one microsecond to process each charge or pixel, then a 2000 pixel line would require two milliseconds for full processing. Thus, the exposure time for the CCD sensor would be equal to a fixed two milliseconds.

The CCD sensor will generally have a fixed noise level. Thus, to optimize the signal to noise ratio of the scanner, it is desirable to maximize the optical signal received at the CCD sensing element. By maximizing the optical signal, with a fixed noise level, the signal to noise ratio can be maximized. However, image quality provided by conventional optical scanners is always limited or hardly upgraded since their expose time and illumination intensity are fixed and a minimum saturation voltage of photoelectric sensing elements, instead of an actual saturation voltage, is set as standard system value. It is desirable to provide a method for increasing the signal to noise ratio of the sensor to overcome the limitations of the prior art.

SUMMARY OF THE INVENTION

It is therefore an object of the invention to provide a method for increasing signal to noise ratio and image quality.

It is another object of this invention to completely utilize the saturation output voltage of the photosensors in an image scanner.

It is a further object of this invention to provide a method for automatically detecting saturation output voltage of the photosensors via adjusting exposure time or illumination intensity so as to obtain optimum output voltage of the photosensors.

To achieve these objects, and in accordance with the purpose of the invention, the invention provide a method for increasing signal to noise ratio. The out voltage of photosensors such as charge coupled devices (CCD) or complemental metal oxide semiconductor sensors is usually derated or lower than the input voltage of the analog to digital converter (ADC). The method for increasing signal to noise ratio of the invention is used to find out the actual saturation voltage of the photosensors and then increases the output voltage of the photosensors by increasing exposure time tint or lamp illumination to near the actual saturation voltage of the photosensors so that the signal to noise ratio can be increased and image quality can be upgraded. The method comprises the following steps. First of all exposure time $T_n$ or illumination $L_{Xn}$ is set. Next a white target chart for said exposure time $T_n$ (illumination $L_{Xn}$) is scanned. Then output digital data $D_n$ via an N bit analog to digital converter are generated. Next output digital data $D_n$ is compared with $2^N-1$. Then exposure time $T_n$ is increased to exposure time $T_{n+1}$ if output digital data is smaller than $2^N-1$. Next white target chart is scanned for exposure time $T_{n+1}$. Then output digital data $D_{n+1}$ are generated via N bit analog to digital converter. Next output digital data $D_{n+1}$ are compared with said output digital data $D_n$. Exposure time $T_n$ is saved when output digital data $D_{n+1}$ is not larger than output digital data $D_n$ Exposure time $T_{n+1}$ is further increased when output digital data $D_{n+1}$ is larger than output digital data $D_n$. However, if output digital data is not smaller than $2^N-1$, then exposure time $T_n$ decreased to exposure time $T_{n+1}$. White target chart is scanned for said exposure time $T_{n+1}$. Output digital data $D_{n+1}$ are generated via said N bit analog to digital converter. Then output digital data $D_{n+1}$ are compared with output digital data $D_n$ Exposure time $T_{n+1}$ is saved when output digital data $D_{n+1}$ is not larger than output digital data $D_n$. Exposure time $T_{n+1}$ is further decreased when output digital data $D_{n+1}$ is larger than output digital data $D_n$.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method for increasing signal noise ratio described below do not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
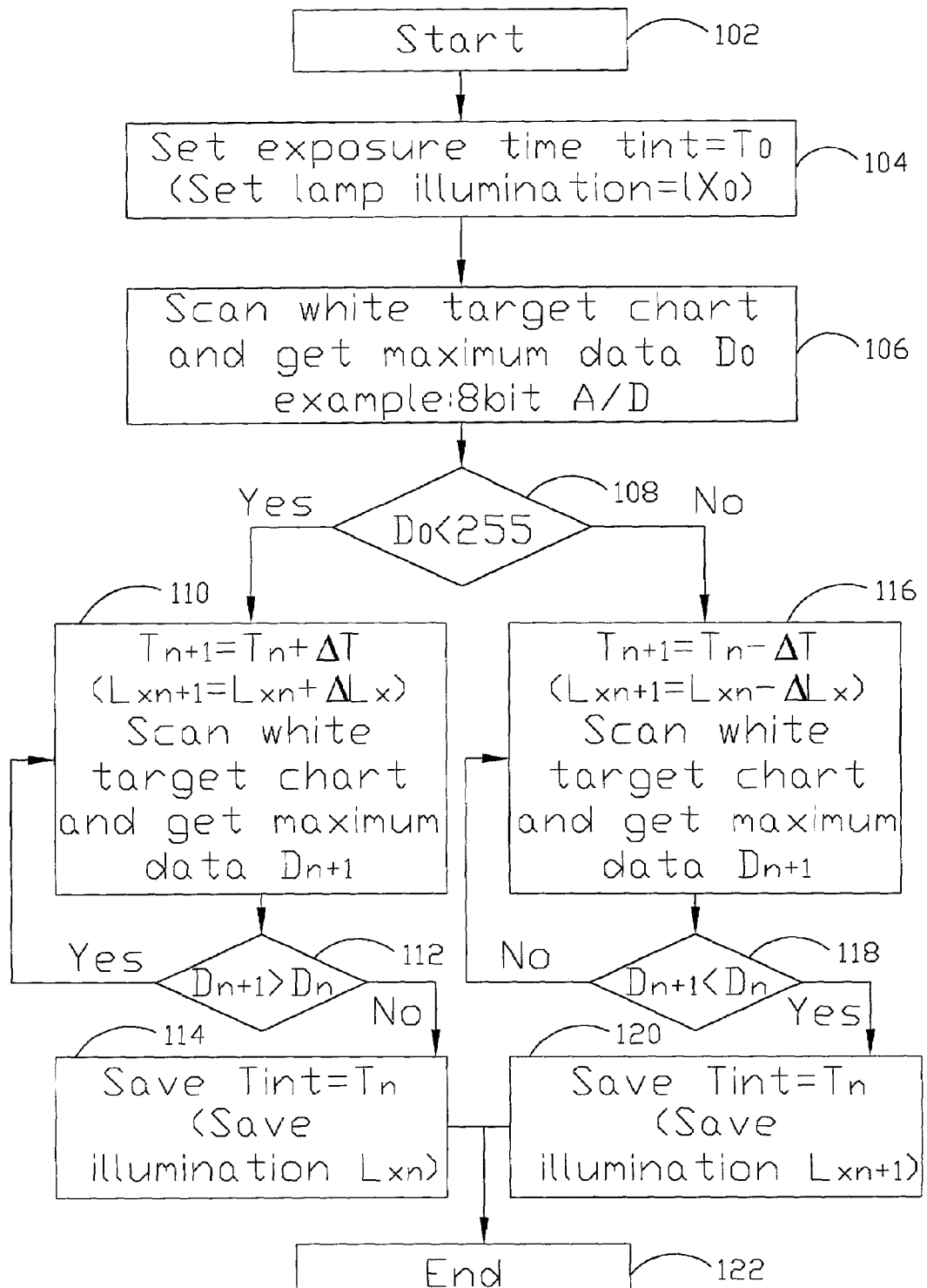
FIG. 1 shows a flow chart of the method for increasing signal noise ratio.

Referring to FIG. 1, a flow chart of the method for increasing signal to noise ratio in accordance with one embodiment of the invention is shown. Under common circumstance, the out voltage of photosensors such as charge coupled devices (CCD) or complementary metal oxide semiconductor sensors is lower than the input voltage of the analog to digital converter (ADC). The method for increasing signal to noise ratio of the invention is used to find out the actual saturation voltage of the photosensors and then increases the output voltage of the photosensors by increasing exposure time tint or lamp illumination to near the actual saturation voltage of the photosensors so that the signal to noise ratio can be increased and image quality can be upgraded. First of all, after step 102, original exposure time tint $T_0$ or original lamp illumination $L_{X0}$ is set in step 104. Since illumination energy E equals the product of exposure time tint T and lamp illumination L, increasing either exposure time tint T or illumination L will increase illumination energy E. Next in step 106, a white target chart is scanned and the photosensors convert the light which it receives into an electric charge. The magnitude of the charge depend on illumination $L_{X0}$ (the intensity of the light) and exposure time tint $T_0$ set forth. Then the charges from the photosensors are converted into analog voltages via the analog amplifier. Finally, the analog voltages are digitized to form a maximum data $D_0$ by the analog to digital converter for digital image processing. If a 8 bit analog to digital converter is utilized, data $D_0$ is from 0 to 255. In step 108, maximum data $D_0$ is compared to 255 if a 8 bit analog to digital converter is utilized. If maximum data $D_0$ is smaller than 255, then exposure time tint $T_n$ or lamp illumination $L_{Xn}$ should be increased and the white target chart is scanned again in step 110. The magnitude of the charge now depends on illumination $L_{Xn+1}$ and exposure time tint $T_{n+1}$. Then the charges from the photosensors are converted into analog voltages via the analog amplifier. Finally, the analog voltages are digitized to form a maximum data $D_{n+1}$ by the analog to digital converter for digital image processing. The maximum data $D_{n+1}$ is then compared to the previous maximum data $D_n$ (starting from $D_0$) in step 112. If the maximum data $D_{n+1}$ is not larger than the previous maximum data $D_n$, that means that the output voltage of the photosensors has been saturated and exposure time tint $T_n$ or illumination $L_{Xn}$ generating the maximum data $D_n$ is saved in step 114. On the contrary, if the maximum data $D_{n+1}$ is larger than the previous maximum data $D_n$, that means that the output voltage of the photosensors has not been saturated and the process goes back step 110 until the output voltage of the photosensors is saturated.

If maximum data $D_0$ is not smaller than 255, then exposure time tint T or lamp illumination $L_{Xn}$ should be decreased and the white target chart is scanned again in step 116. The magnitude of the charge depend on illumination $L_{Xn+1}$ and exposure time tint $T_{n+1}$. Then the charges from the photosensors are converted into analog voltages via the analog amplifier. Finally, the analog voltages are digitized to form a maximum data $D_{n+1}$ by the analog to digital converter for digital image processing. The maximum data $D_{n+1}$ is then compared to the previous maximum data $D_n$ (starting from $D_0$) in step 118. If the maximum data $D_{n+1}$ is smaller than the previous maximum data $D_n$, that means that the output voltage of the photosensors has been saturated and exposure time tint $T_{n+1}$ or illumination $L_{Xn+1}$ generating the maximum data $D_{n+1}$ is saved in step 120. On the contrary, if the maximum data $D_{n+1}$ is not smaller than the previous maximum data $D_n$, that means that the output voltage of the photosensors has not been saturated and the process goes back step 116 until the output voltage of the photosensors is saturated.

Figure 2:
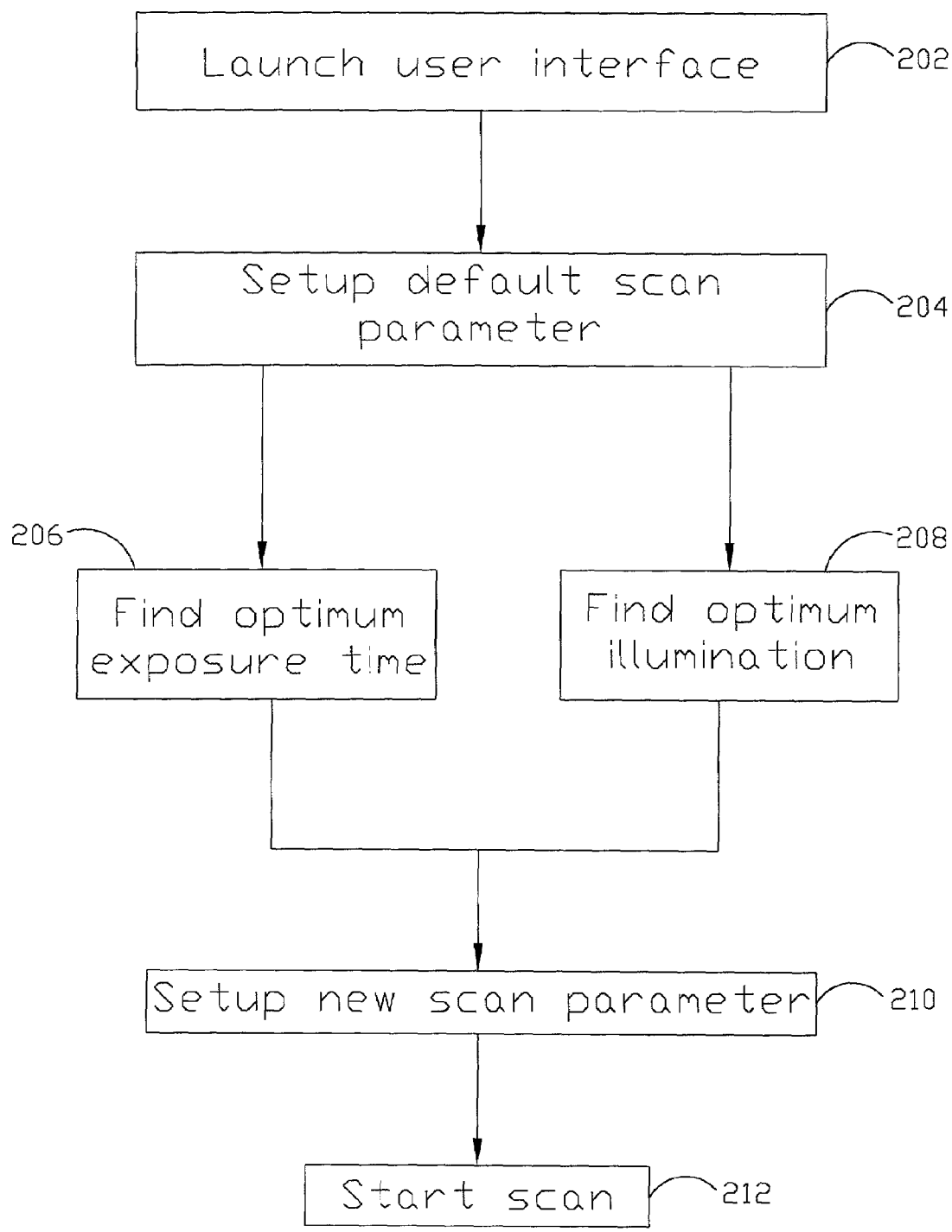
FIG. 2 shows a flow chart of how the method of this invention is utilized in a scanning procedure.

Referring to FIG. 2, a flow chart of how the method of this invention is utilized in a scanning procedure is shown. In step 202, an user interface operated in personal computer is launched. Then default scan parameters are set up in step 204. Next optimum exposure time or optimum illumination is found in step 206 or 208 via the method described above and shown in FIG. 1. New scan parameters obtained in step 206 or 208 are then set up before starting scan in step 212.

Figure 3:
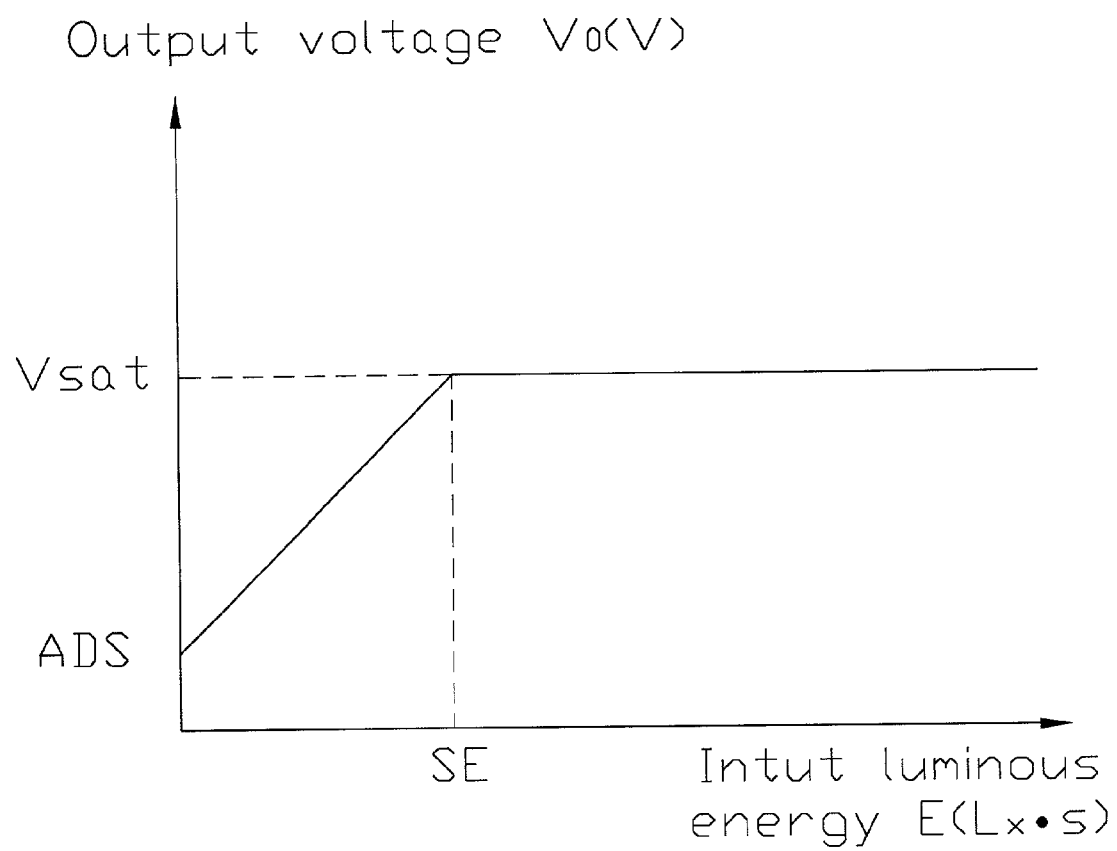
FIG. 3 shows a diagram of saturation voltage $V_{sat}$ versus input illumination energy E.

FIG. 3 shows a diagram of output voltage $V_0$ of photosensors versus input illumination energy $E(L_x \times T)$. As shown in the figure, output voltage $V_0$ increases linearly with input illumination energy E until saturation exposure SE is reached, wherein ADS means average dark signal. Output voltage $V_0$ equals saturation voltage $V_{sat}$ at saturation exposure SE.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for increasing signal to noise ratio, said method comprising:
    setting exposure time $T_n$;
    scanning a white target chart for said exposure time $T_n$;
    generating output digital data $D_n$ via an N bit analog to digital converter;
    comparing said output digital data $D_n$ with $2^N-1$;
    increasing said exposure time $T_n$ to exposure time $T_{n+1}$ if said output digital data is smaller than $2^N-1$;

scanning said white target chart for said exposure time $T_{n+1}$;

generating output digital data $D_{n+1}$ via said N bit analog to digital converter; and comparing said output digital data $D_{n+1}$ with said output digital data $D_n$.

2. The method according to claim 1, wherein said N bit analog to digital converter comprises a 8 bit analog to digital converter.

3. The method according to claim 1, said exposure time $T_n$ is saved when said output digital data $D_{n+1}$ is not larger than said output digital data $D_n$.

4. The method according to claim 1, said exposure time $T_{n+1}$ is further increased when said output digital data $D_{n+1}$ is larger than said output digital data $D_n$.

5. A method for increasing signal to noise ratio, said method comprising:

setting exposure time $T_n$;

scanning a white target chart for said exposure time $T_n$;

generating output digital data $D_n$ via an N bit analog to digital converter;

comparing said output digital data $D_n$ with $2^N-1$;

decreasing said exposure time $T_n$ to exposure time $T_{n+1}$ if said output digital data is not smaller than $2^N-1$;

scanning said white target chart for said exposure time $T_{n+1}$;

generating output digital data $D_{n+1}$ via said N bit analog to digital converter; and comparing said output digital data $D_{n+1}$ with said output digital data $D_n$.

6. The method according to claim 5, said exposure time $T_{n+1}$ is saved when said output digital data $D_{n+1}$ is not larger than said output digital data $D_n$.

7. The method according to claim 5, said exposure time $T_{n+1}$ is further decreased when said output digital data $D_{n+1}$ is larger than said output digital data $D_n$.

8. A method for increasing signal to noise ratio, said method comprising:

setting illumination $L_{Xn}$;

scanning a white target chart with said illumination $L_{Xn}$;

generating output digital data $D_n$ via an N bit analog to digital converter;

comparing said output digital data $D_n$ with $2^N-1$;

increasing said illumination $L_{Xn}$ to illumination $L_{Xn+1}$ if said output digital data is smaller than $2^N-1$;

scanning said white target chart with said illumination $L_{Xn+1}$;

generating output digital data $D_{n+1}$ via said N bit analog to digital converter; and comparing said output digital data $D_{n+1}$ with said output digital data $D_n$.

9. The method according to claim 8, said illumination $L_{Xn}$ is saved when said output digital data $D_{n+1}$ is not larger than said output digital data $D_n$.

10. The method according to claim 8, said illumination $L_{Xn+1}$ is further increased when said output digital data $D_{n+1}$ is larger than said output digital data $D_n$.

11. A method for increasing signal to noise ratio, said method comprising:

setting illumination $L_{Xn}$;

scanning a white target chart with said illumination $L_{Xn}$;

generating output digital data $D_n$ via an N bit analog to digital converter;

comparing said output digital data $D_n$ with $2^N-1$;

decreasing said illumination $L_{Xn}$ to illumination $L_{Xn+1}$ if said output digital data is not smaller than $2^N-1$;

scanning said white target chart with illumination $L_{Xn+1}$;

generating output digital data $D_{n+1}$ via said N bit analog to digital converter; and comparing said output digital data $D_{n+1}$ with said output digital data $D_n$.

12. The method according to claim 11, said illumination $L_{Xn+1}$ is saved when said output digital data $D_{n+1}$ is smaller than said output digital data $D_n$.

13. The method according to claim 11, said illumination $L_{Xn+1}$ is further decreased when said output digital data $D_{n+1}$ is not smaller than said output digital data $D_n$.

* * * * *

UNITED STATES PATENT AND TRADEMARK OFFICE
CERTIFICATE OF CORRECTION

PATENT NO.         : 7,034,957 B2                                            Page 1 of 1
APPLICATION NO. : 10/121545
DATED              : April 25, 2006
INVENTOR(S)        : Yang et al.

It is certified that error appears in the above-identified patent and that said Letters Patent is hereby corrected as shown below:

At column 5, line 10, please replace "claim 1, said exposure time" with --claim 1, wherein said exposure time--
At column 5, line 13, please replace "claim 1, said exposure time" with --claim 1, wherein said exposure time--
At column 5, line 31, please replace "claim 5, said exposure time" with --claim 5, wherein said exposure time--
At column 5, line 34, please replace "claim 5, said exposure time" with --claim 5, wherein said exposure time--

Signed and Sealed this

Twenty-fourth Day of March, 2009

JOHN DOLL
*Acting Director of the United States Patent and Trademark Office*